United States Patent
Naito et al.

[11] Patent Number: 5,929,541
[45] Date of Patent: Jul. 27, 1999

[54] SYNCHRONOUS MACHINE

[75] Inventors: Kinsiro Naito; Satoru Matsubara; Tokuzou Sekiyama, all of Ishida 318-3, Isehara, Kanagawa-ken, Japan

[73] Assignees: Kinsiro Naito; Satoru Matsubara; Tokuzou Sekiyama; Shizuo Kida, all of, Japan

[21] Appl. No.: 09/096,406

[22] Filed: Jun. 11, 1998

Related U.S. Application Data

[62] Division of application No. 08/753,526, Nov. 26, 1996, Pat. No. 5,864,197.

[51] Int. Cl.$^6$ .................................................. H02K 41/02
[52] U.S. Cl. ............................................. 310/12; 310/13
[58] Field of Search ......................................... 310/12, 13

[56] References Cited

U.S. PATENT DOCUMENTS

| | | | |
|---|---|---|---|
| 2,802,959 | 8/1957 | Powers | 310/156 |
| 3,321,652 | 5/1967 | Opel | 310/168 |
| 3,599,024 | 8/1971 | Kitamura | 310/263 |

*Primary Examiner*—Nestor Ramirez
*Assistant Examiner*—Karl Tamai
*Attorney, Agent, or Firm*—Graham & James LLP

[57] ABSTRACT

A magnetic field core and armature core are provided on a rotor in spaced-apart relation to each other. Windings for producing rotating magnetic poles are positioned on the magnetic field core, and armature windings are positioned on the armature core. The rotor includes a plurality of magnetic sections which are magnetically coupled with the magnetic field core and armature core, but the magnetic sections are magnetically separated from each other in a direction of rotation of the rotating magnetic poles. Magnetic poles produced on the rotor will be coupled together through a magnetic path formed by the rotor and armature core. Thus, by passing three-phase alternating currents, corresponding to the magnetic poles produced on the rotor, through the armature windings, torque is developed in accordance with the Fleming's rule, so that the rotor is caused to rotate as a motor at a synchronous speed. Only the intensities of the currents flowing through the field and armature windings have to be controlled, in order to control the intensity of this torque. By causing the rotor to rotate via external drive force and passing filed currents corresponding on a rotating position of the rotor, induced electromotive force is developed in the armature windings, so that the synchronous machine operates as a generator.

8 Claims, 9 Drawing Sheets

SYNCHRONOUS MACHINE

This application is a divisional of Ser. No. 08/753,526 filed Nov. 26, 1996 which issued as U.S. Pat. No. 5,864,197 on Jan. 26, 1999.

BACKGROUND OF THE INVENTION

The present invention relates generally to synchronous machines such as synchronous motors and synchronous power generators, and more particularly to a synchronous machine where field and armature windings are positioned on a stator.

Synchronous motors are available in a variety of designs, such as the rotating-armature, rotating-field and inductor types. The rotating-armature type synchronous motors comprise a magnetic field pole provided on a stator, and an armature winding provided on a rotor. The rotating-field type synchronous motors comprise an armature winding provided on a stator, and a magnetic field pole provided on a rotor. The magnetic field pole in the rotating-field type synchronous motors is typically a permanent magnet positioned on the rotor, or a magnetic field winding that is excited by direct current. The inductor-type synchronous motors comprise a magnetic field pole and armature winding provided on a stator, and an inductor provided on a rotor and having gear-like teeth and slots.

Since the armature winding is provided on the stator as mentioned, the rotating-field type synchronous motors are substantially free from mechanical damages and breakage and permit easy insulation, so that they are widely used today as driving means for rotating the spindles of various machine tools.

However, such rotating-field type synchronous motors where the field pole is a permanent magnet positioned on the rotor are disadvantageous in that the permanent magnet itself is expensive and must be secured firmly enough to not accidentally detach from the rotor and also in that it is difficult to provide large capacity because the magnetic field produced is always constant. The rotating-field type synchronous motors where the field pole is a magnetic field winding provided on the rotor are also disadvantageous in that they essentially require slip rings and a rotary transformer in order to supply field current to the rotor.

SUMMARY OF THE INVENTION

It is therefore an object of the present invention to provide a synchronous machine having both a field winding and an armature winding on the stator, which does not require slip rings and a rotary transformer in order to supply electric current to the rotor and which allows the intensity of magnetic flux to be freely controlled via the windings provided on the stator.

In order to accomplish the above-mentioned object, a synchronous machine in accordance with a first aspect of the present invention comprises a stator, a magnetic field core provided on the stator and having windings positioned thereon for producing rotating magnetic poles, an armature core provided on the stator in a spaced-apart relation to the magnetic field core and having armature windings positioned thereon, and a rotor including a plurality of magnetic sections which are magnetically coupled with the magnetic field core and armature core but are magnetically separated from each other in a direction of rotation of the rotating magnetic poles.

In the synchronous machine according to the first aspect, the magnetic field core and armature core are provided on the stator in spaced-apart relation to each other. Windings for producing rotating magnetic poles are positioned on the magnetic field core, and armature windings are positioned on the armature core. The rotor includes a plurality of magnetic sections which are magnetically coupled with the magnetic field core and armature core, but the magnetic sections are magnetically separated from each other in a direction of rotation of the rotating magnetic poles. Namely, where the magnetic field core is of a type which generates rotating poles (rotating magnetic fields) by three-phase alternating currents, one or more of the magnetic sections facing the N pole of the magnetic field core becomes an S pole and other one or more of the magnetic sections facing the S pole of the magnetic field core becomes an N pole. Because of the magnetic separation between the magnetic sections in the direction of rotation, the N and S poles produced on the rotor in response to the rotating magnetic poles of the magnetic field core are prevented from being magnetically coupled together via the rotor.

However, because the rotor is magnetically coupled with the armature core, the N and S poles produced on the rotor will be brought into magnetic coupling with each other via the armature core; namely, the N and S poles will be coupled together through a magnetic path formed by the rotor and armature core. Thus, by passing three-phase alternating currents, corresponding to the magnetic poles produced in the rotor, through the armature windings, torque is developed in accordance with the Fleming's rule so that the rotor is caused to rotate as a motor at a synchronous speed. Only the intensities of the currents flowing through the field and armature windings have to be controlled, in order to control the intensity of this torque. On the other hand, by causing the rotor to rotate via external drive force and passing through the field windings electric currents corresponding to a rotating position of the rotor, induced electromotive force is developed in the armature windings, so that the synchronous machine operates as a generator.

A second aspect of the present invention provides a linear synchronous machine which is directed to causing linear movement of a moving member and which generally corresponds, in structure and operation, to a linearly unfolded version of the above-mentioned rotary synchronous machine. Thus, by passing through the armature windings three-phase alternating currents corresponding to magnetic poles produced on the moving member, a thrust is developed in accordance with the Fleming's rule so that the moving member is driven to linearly move at a synchronous speed corresponding to the thrust.

BRIEF DESCRIPTION OF THE DRAWINGS

For better understanding of the present invention, the preferred embodiments of the invention will be described in detail below with reference to the accompanying drawings, in which.

DETAILED DESCRIPTION OF THE PREFERRED EMBODIMENTS

Figure 1:
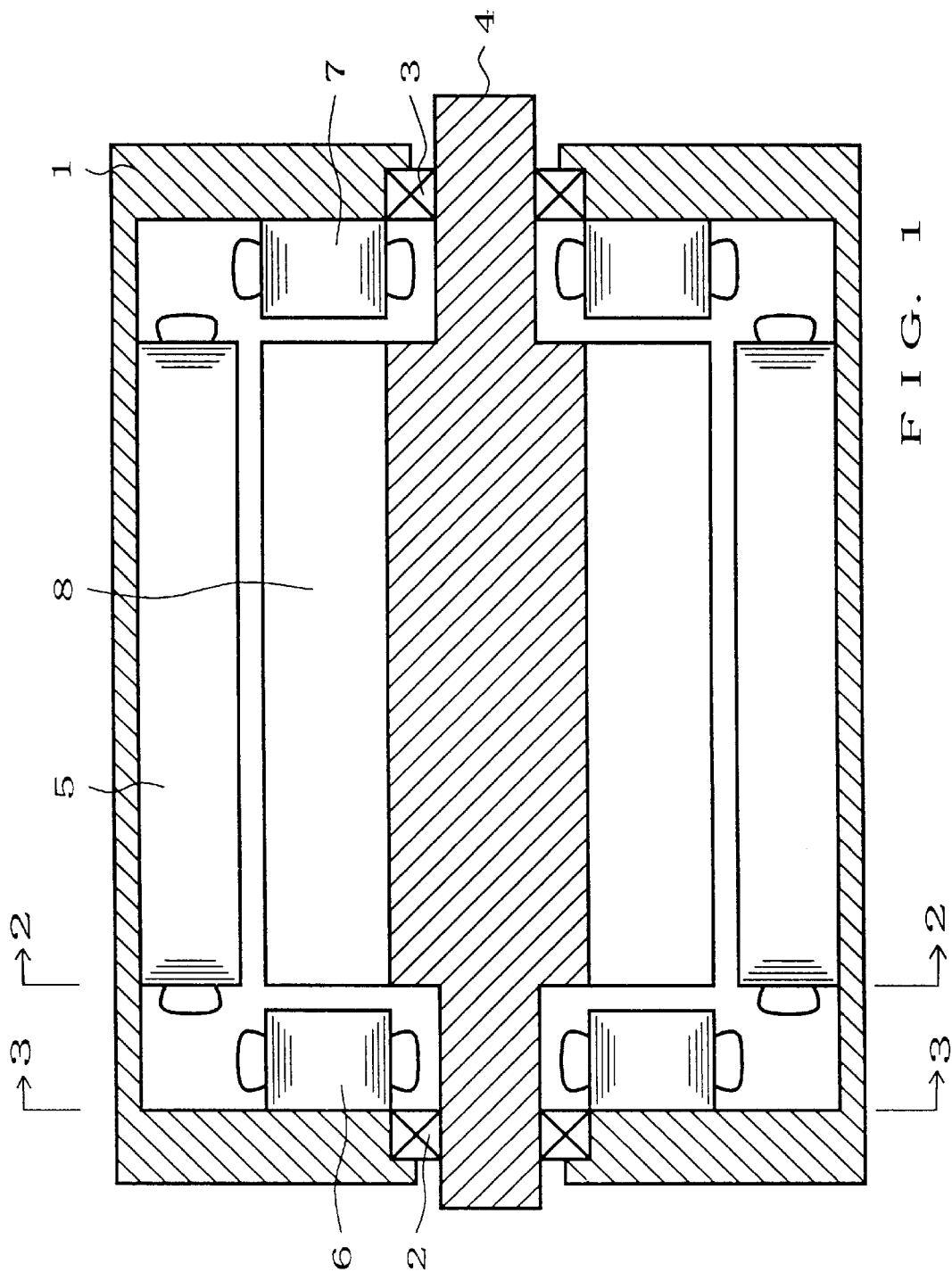
FIG. 1 is a sectional view of a rotary synchronous motor according to an embodiment of the present invention, taken longitudinally through a rotational shaft thereof.
Figure 2:
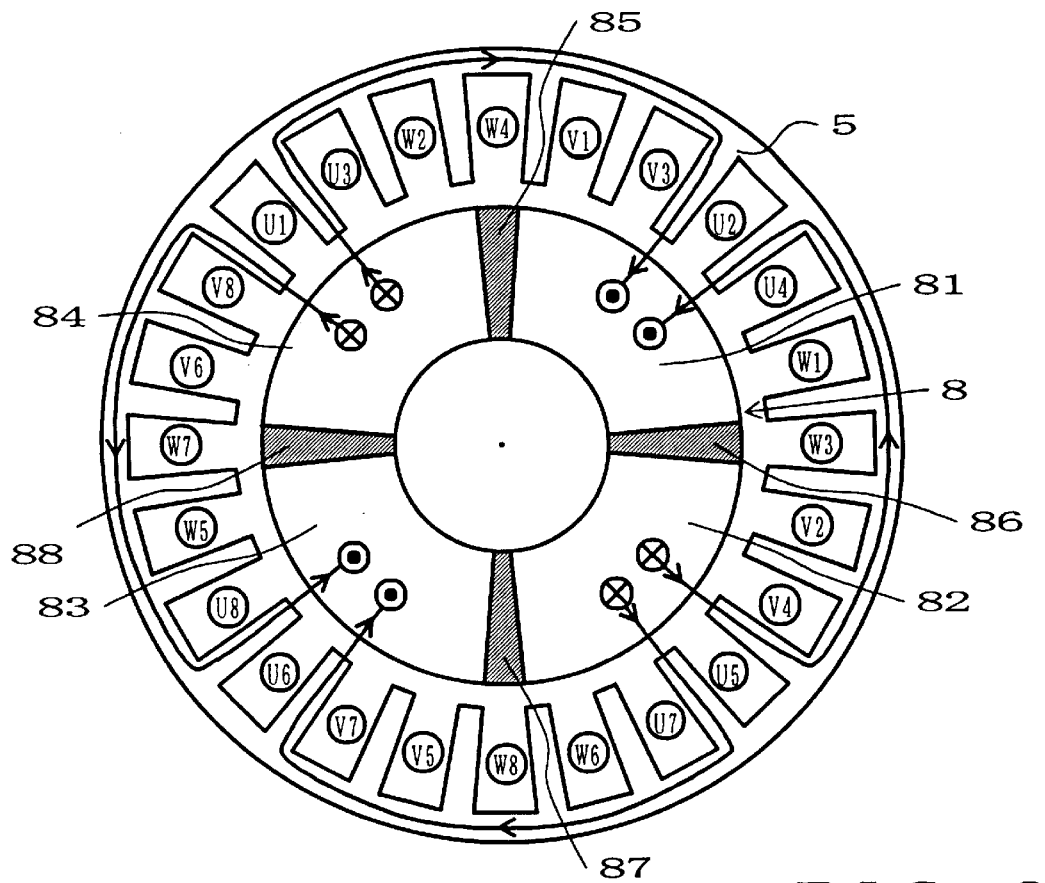
FIG. 2 is a sectional view of the rotary synchronous motor taken along the line 2—2 of FIG. 1.
Figure 3:
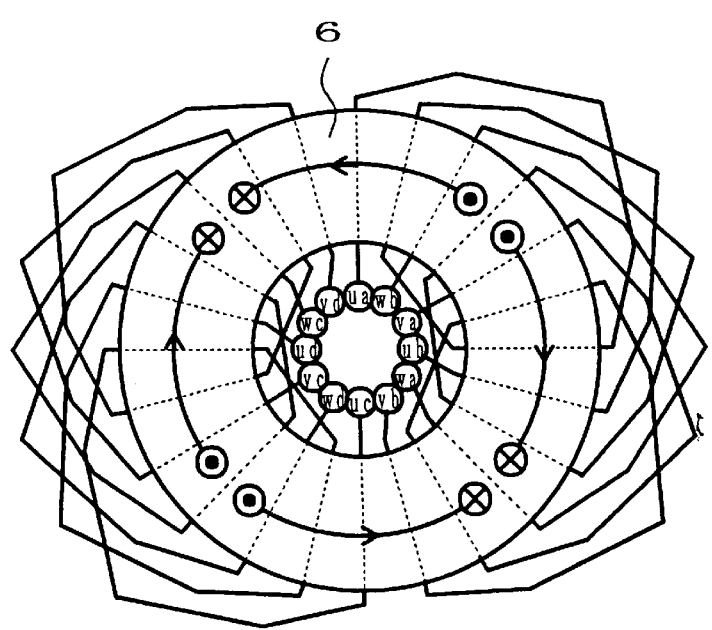
FIG. 3 is a sectional view of the rotary synchronous motor taken along the line 3—3 of FIG. 1.

In FIGS. 1, 2 and 3, there is shown a rotary synchronous motor according to one embodiment of the present invention, of which FIG. 1 is a sectional view of the synchronous motor taken longitudinally through its rotational shaft, FIG. 2 is a sectional view of the synchronous motor taken along the line 2—2 of FIG. 1, and FIG. 3 is a sectional view of the synchronous motor taken along the line 3—3 of FIG. 1.

This rotary synchronous motor is of a type which has four poles and is driven by three-phase alternating currents. As shown in FIG. 1, the synchronous motor includes a cylindrical stator frame 1 and the rotational shaft 4 rotatably mounted in the stator frame 1 via bearings 2 and 3. Within the stator frame 1, an armature core 5 and two magnetic field cores 6 and 7 are provided on the inner surfaces of the stator frame 1, and a rotor 8 having an alternating sequence of magnetic and nonmagnetic sections is mounted on the rotational shaft 4.

The armature core 5 comprises a cylindrical laminated iron core provided along the inner peripheral surface of the stator frame 1, which has 24 radial slots formed along the inner periphery thereof. In the radial slots of the armature core 5 are received two sets of three-phase armature windings (armature windings), one winding portion or coil in each of the slots. The laminated core of the armature core 5 comprises a plurality of thin silicon steel rings stacked axially.

Figures 4A, 4B:
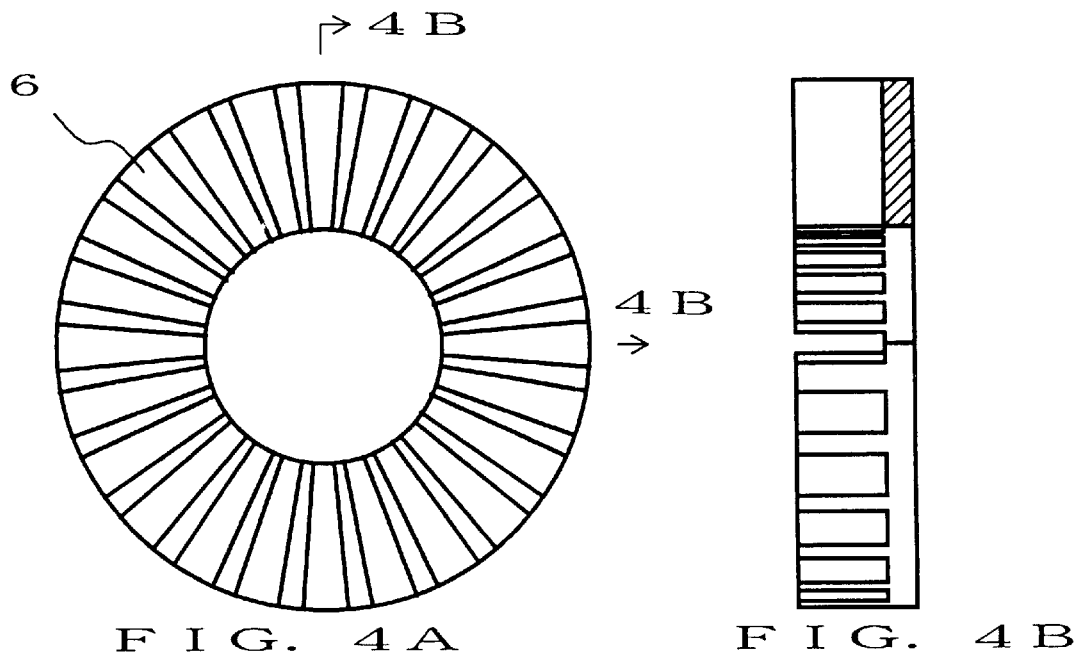
FIG. 4A is a diagram of one of magnetic field cores shown in FIG. 1.
FIG. 4B is a sectional view taken along the line 4B—4B of FIG. 4A.

The magnetic field cores 6 and 7 are similar annular mounted on the opposed, flat inner end surfaces of the stator frame 1 adjacent to opposite ends of the rotor 8. FIG. 4A is a diagram of one of the magnetic field cores (magnetic field core 6 in the illustrated example) as viewed from the rotor 8, and FIG. 4B is a sectional view taken along the line 4B—4B of FIG. 4A. For simplicity of illustration, no magnetic field windings are shown in these figures. As shown in FIGS. 4A and 4B, each of the magnetic field cores 6 and 7 has 24 radial slots formed in its inner surface facing the end surface of the rotor 8. In the radial slots of the magnetic field cores 6 and 7 are received two (first and second) sets of three-phase field windings. Each of the laminated iron cores of the cores 6 and 7 comprises a plurality of thin silicon steel rings stacked in the radial direction of the core and hence of the rotational shaft 4.

As shown in FIG. 2, the three-phase armature windings on the armature core 5 comprise two (first and second) U-phase, V-phase and W-phase windings that are positioned to be shifted from each other by 120 electrical degrees. In the specification and FIGS. 2 and 3, the armature windings are denoted with upper-case alphanumerics while the field windings are denoted with lower-case alphanumerics.

The first and second U-phase windings are positioned on the armature core 5 via eight slots in ascending order of winding portion numbers, i.e., "U1"-"U2"-"U3"-"U4"-"U5"-"U6"-"U7"-"U8". The first and second V-phase windings are positioned on the armature core 5 via eight slots in ascending order of winding portion numbers, i.e., "V1"-"V2"-"V3"-"V4"-"V5"-"V6"-"V7"-"V8". Similarly, the first and second W-phase windings are positioned on the armature core 5 via eight slots in ascending order of winding portion numbers, i.e., "W1"-"W2"-"W3"-"W4"-"W5"-"W6"-"W7"-"W8". The U-phase, V-phase and W-phase windings are positioned to be shifted from each other by 120 electrical degrees as earlier noted; that is, the U-phase, V-phase and W-phase windings are displaced with respect to each other in the clockwise direction by four slots.

Similarly to the three-phase armature windings, the three-phase field windings on the magnetic field core 6, as shown in FIG. 3, comprise two (first and second) u-phase, v-phase and w-phase windings that are positioned to be shifted from each other by 120 electrical degrees.

The u-phase windings comprise the first u-phase winding wound on the magnetic field core 6 to extend from a winding start portion ua to a winding end portion ub via four slots, and the second u-phase winding wound on the magnetic field core 6 to extend from from a winding start portion uc to a winding end portion ud via four slots. The v-phase windings comprise the first v-phase winding wound on the magnetic field core 6 to extend from a winding start portion va to a winding end portion vb via four slots, and the second v-phase winding wound on the magnetic field core 6 to extend from a winding start portion vc to a winding end portion vd via four slots. The w-phase windings comprise the first w-phase winding wound on the magnetic field core 6 to extend from a winding start portion wa to a winding end portion wb via four slots, and the second w-phase winding wound on the magnetic field core 6 to extend from from a winding start portion wc to a winding end portion wd via four slots.

The three-phase windings on the magnetic field core 7 are similar in structure to the three-phase field windings on the magnetic field core 6 and positioned in symmetry with the field windings about the rotor 8.

The respective three-phase windings on the magnetic field cores 6 and 7 are positioned to be shifted from the armature windings by 120 electrical degrees. More specifically, the u-phase magnetic field windings are positioned to be shifted in the clockwise direction from the U-phase armature windings by three slots (90 electrical degrees), the v-phase magnetic field windings are also positioned to be shifted in the clockwise direction from the V-phase armature windings by three slots (90 electrical degrees), and the w-phase magnetic field windings are also positioned to be shifted in the clockwise direction from the W-phase armature windings by three slots (90 electrical degrees). Note that the shift amounts may be in the neighborhood of 90°, rather than exactly 90°, depending on the specific structure of the synchronous motor.

As seen from FIGS. 4A and 4B, the rotor 8 is generally in a cylindrical shape and provided around the rotational shaft 4. The rotor 8 includes an alternating sequence of four magnetic sections 81 to 84 and four nonmagnetic sections 85 to 88 provided axially along the rotational shaft 4, or along a direction of magnetic flux flowing from magnetic poles (S and N poles) produced on the magnetic field cores 6 and 7. The nonmagnetic section 85 to 88 act to separate the magnetic sections 81 to 84 in such a manner that the magnetic sections 81 to 84 are not magnetically coupled with each other in the direction of rotation of the rotor 8. However, the magnetic sections 81 to 84 are magnetically coupled with the armature core 5 and the magnetic field cores 6 and 7. If the spacing of the magnetic sections 81 to 84 from the nonmagnetic sections 85 to 88 is chosen to be about 3–10 mm, then it will suffice that the spacing between the nonmagnetic sections 85 to 88 and the magnetic field cores 6 and 7 be about 0.5–3 mm. By the magnetic sections 81 to 84 being thus magnetically separated by the intervening nonmagnetic sections 85 to 88, the magnetic flux flowing from the N poles of the magnetic field cores 6 and 7 are easily directed into the armature core 5 by way of the magnetic sections 81 to 84.

The following three-phase alternating currents iu, iv and iw, phase-shifted from each other by 120 electrical degrees, are passed through the three-phase windings on the field core 6:

$$iu = im \cdot \sin \omega t$$

$$iv = im \cdot \sin (\omega t - 2\pi/3)$$

$$iw = im \cdot \sin (\omega t - 4\pi/3)$$

where im represents a maximum value of each of the currents.

By such currents iu, iv and iw flowing through the three-phase field windings on the field core 6, the magnetic poles producing magnetic flux directed toward the curved surfaces of the magnetic sections 82 and 84 of the rotor 8 (N pole) and the magnetic poles absorbing magnetic flux from the curved surface of the magnetic sections 81 and 83 (S pole), as shown in FIG. 3, are both caused to revolve in the clockwise direction on a flat surface of the core 6 facing the rotor 8. Similar three-phase alternating currents iu, iv and iw are passed through the three-phase field windings on the field core 7, so that the magnetic poles (N and S poles) are both caused to revolve in the clockwise direction on a flat surface of the core 7 facing the rotor 8 as in the field core 6.

Magnetic fields in and around the magnetic poles (N and S poles) produced by the three-phase currents assumes a sinusoidal magnetic flux distribution in the direction of rotation, and the magnetic flux can be expressed as follows where the maximum magnetic flux is represented by $\Phi$ and the pole center is represented by $\theta = 0$:

$$\Phi = \Phi m \cdot \cos \theta$$

If the currents flowing through the three-phase field windings are controlled in such a manner that the pole center of the magnetic fields produced by the field windings coincides with an "easiest-to-magnetize" surface portion of the rotor 8, the rotor 8 will be magnetized in a predetermined direction and assume a magnetic flux density that can be approximately expressed by $$B = Bm \cdot \cos \theta$$

Namely, the magnetic sections 81 to 84 of the rotor 8 are magnetized in predetermined directions depending on the magnetic poles (N and S poles) produced on the field cores 6 and 7. For example, by the currents iu, iv, iw, N poles are produced on the surfaces of the field cores 6 and 7 facing the magnetic sections 82 and 84 and S poles are produced on the surfaces of the field cores 6 and 7 facing the magnetic sections 81 and 83, in response to which S poles are produced on the flat surfaces of the magnetic sections 82 and 84 facing the field cores 6 and 7 and N poles are produced on the curved surfaces of the magnetic sections 82 and 84 facing the armature core 5; similarly, N poles are produced on the flat surfaces of the magnetic sections 81 and 83 facing the field cores 6 and 7 and S poles are produced on the curved surfaces of the magnetic sections 81 and 83 facing the armature core 5.

Namely, the magnetic flux flowing from the N poles of the field cores 6 and 7 enters the magnetic sections 82 and 84 through their S-pole flat surfaces. The magnetic flux, after having entered the magnetic sections 82 and 84, enters the armature core 5 via their N-pole curved surfaces, passes along the outer peripheral portion of the core 5, and then enters the magnetic sections 81 and 83 via their S-pole curved surfaces. After this, the magnetic flux enters the S-pole flat surfaces of the field cores 6 and 7 from the N-pole flat surfaces of the magnetic sections 81 and 83. Thus, in this synchronous machine, predetermined magnetic circuits are formed by the field cores 6 and 7, rotor 8 and armature core 5.

On the other hand, the following three-phase alternating currents IU, IV and IW, phase-shifted from each other by 120 electrical degrees, are passed through the three-phase windings on the armature core 5:

$$IU = Im \cdot \sin \omega t$$

$$IV = Im \cdot \sin (\omega t - 2\pi/3)$$

$$IW = Im \cdot \sin (\omega t - 4\pi/3)$$

Because the three-phase armature windings are phase-shifted from the corresponding field windings by 120 electrical degrees in this case, torque T is developed in accordance with the Fleming's rule, which causes rotation of the rotor 8 (rotational shaft 4). In this case, only the intensities of the currents passed through the field and armature windings have to be controlled in order to control the intensity of this torque T. Although the armature currents may produce magnetic flux, influence of the flux is negligible because reluctance of the rotor is set to be great in the direction of the magnetic flux to thereby make magnetization of the rotor difficult.

With the embodiment arranged in the above-mentioned manner, it is no longer necessary to mount the field coils or permanent magnet on the rotor as with the prior art synchronous motors, nor is it necessary to use silicon steel rings in the rotor, form slots in the silicon steel rings and position squirrel-cage windings made of aluminum, copper or the like in the slots. Thus, the embodiment can provide a rotating-field type synchronous machine which would not involve unwanted generation of heat due to induced currents.

Figure 5:
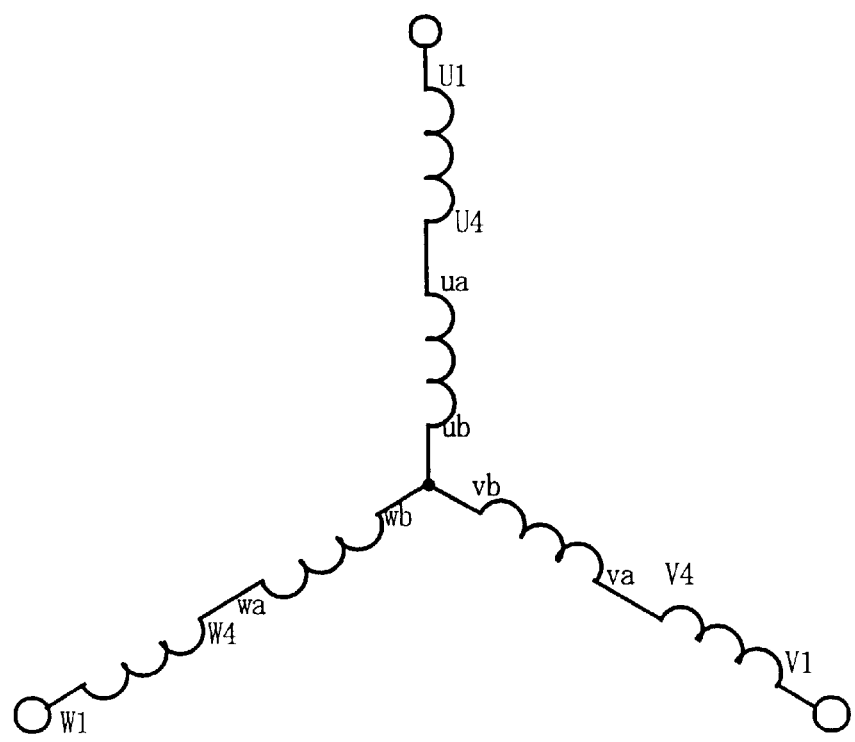
FIG. 5 is a diagram illustrating exemplary wiring between armature and field windings in the rotary synchronous motor of FIG. 1.

FIG. 5 is a diagram illustrating exemplary wiring between the armature and field windings in the rotary synchronous motor. In the case where the armature and field windings are mechanically positioned to be phase-shifted from each other by 90 electrical degrees as shown in FIG. 2, the armature and field windings can be wound in series with each other, and the motor can be controlled via a single inverter as an A.C. motor having series winding characteristics. If the armature and field windings are mechanically positioned to be in phase with each other in stead of being phase-shifted by 90 electrical degrees, it suffices that the field and armature currents are phase-shifted from each other by 90 electrical degrees.

Figure 6:
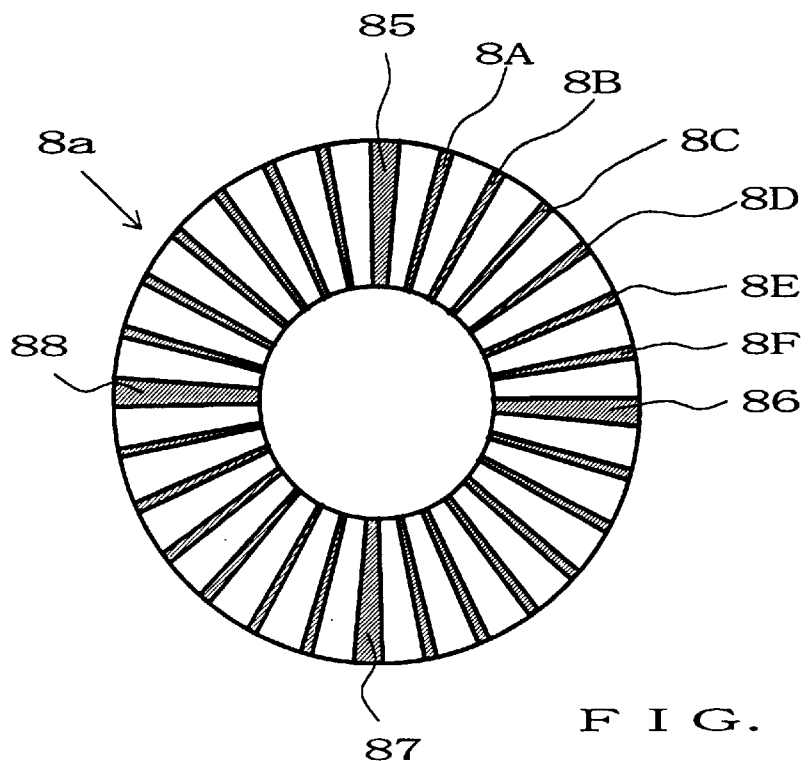
FIG. 6 is a diagram illustrating another embodiment of a four-pole rotor of FIG. 2.
Figure 7:
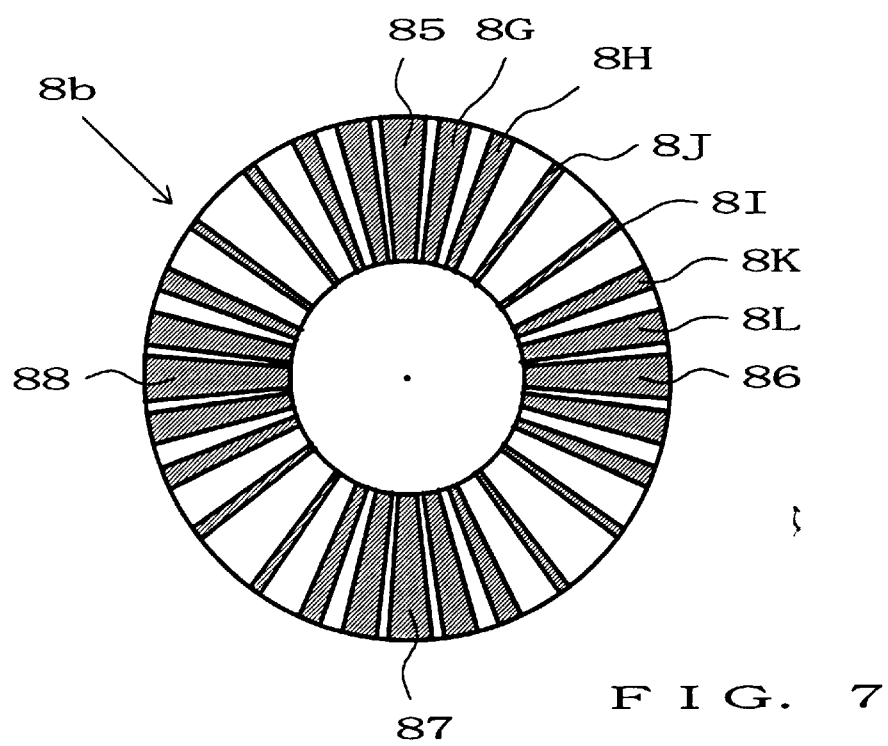
FIG. 7 is a diagram illustrating still another embodiment of the four-pole rotor of FIG. 2.

FIGS 6 and 7 are both diagrams illustrating other embodiments of the four-pole rotor 8 of FIG. 2. In rotor 8a of FIG. 6, the magnetic sections 81 to 84 provided along the direction of passage of the magnetic flux produced by the field windings (i.e., axially along the rotational shaft) are magnetically separated from each other more finely by additional nonmagnetic sections 8A to 8F in the rotational or angular direction of the rotor 8a. For simplicity of illustration, no reference characters are attached to the additional nonmagnetic sections separating the magnetic sections 82 to 84 in FIG. 6. Degree of the magnetic separation attained by the additional nonmagnetic sections 8A to 8F in this embodiment is far smaller than that attained by the main nonmagnetic sections 85 to 88 as described earlier in relation to FIG. 2. For example, if the thickness (as measured in the rotational direction of the rotor) of each of the main nonmagnetic sections 85 to 88 is about 3–10 mm, the thickness (as measured in the angular direction of the rotor) of each of the additional nonmagnetic sections 8A to 8F may be chosen to be about 0.3–3 mm. With this rotor 8a thus arranged, it is possible to preclude influence of the magnetic flux produced by the armature currents, i.e., the armature reaction.

Rotor 8b of FIG. 7 is similar to the rotor 8a of FIG. 6 in that the magnetic sections 81 to 84 provided along the direction of passage of the magnetic flux produced by the field windings (i.e., along the rotational shaft) are magnetically separated from each other more finely by additional nonmagnetic sections 8G to 8L in the rotational (angular) direction of the rotor 8b. The rotor 8b is different from the rotor 8a in that the respective thicknesses (as measured in the rotational direction of the rotor) of the magnetic sections 81 to 84 as separated by the additional nonmagnetic sections 8G to 8L (i.e., magnetic segments) correspond to a sinusoidal distribution of densities of the magnetic flux produced by the magnetic field cores. For simplicity of illustration, no reference characters are attached to the nonmagnetic sections separating the magnetic sections 82 to 84 in FIG. 7 as well.

While the magnetic sections 81 to 84 separated by the additional nonmagnetic sections 8A to 8F have a same thickness in the rotor 8a of FIG. 6, the magnetic sections 81 to 84 separated by the additional nonmagnetic sections 8G to 8L have different thicknesses corresponding to the sinusoidal distribution of the magnetic flux densities in the rotor 8b of FIG. 7. That is, in each of the magnetic sections 81 to 84 of the rotor 8b, each segments closer to the adjacent main nonmagnetic sections 85, 86; 86, 87; 87, 88; 88, 85 than the other segments is smaller in thickness than the other segments, with the segment located centrally between the adjacent main nonmagnetic sections having the greatest thickness. In other words, the respective thicknesses of the additional nonmagnetic sections 8G, 8H, 8J are chosen to become sequentially smaller in the mentioned order (i.e., from 8G to 8J), while the respective thicknesses of the additional nonmagnetic sections 8I, 8K, 8L are chosen to become sequentially greater in the mentioned order (i.e., from 8I to 8K).

With the rotor 8b thus arranged, magnetic poles (N and S poles) corresponding to the sinusoidal distribution of the magnetic flux produced by the magnetic field currents can be produced on the outer peripheral surface of the rotor 8b, and thus it is possible to remarkably improve the rotational characteristics of the motor.

Figure 8:
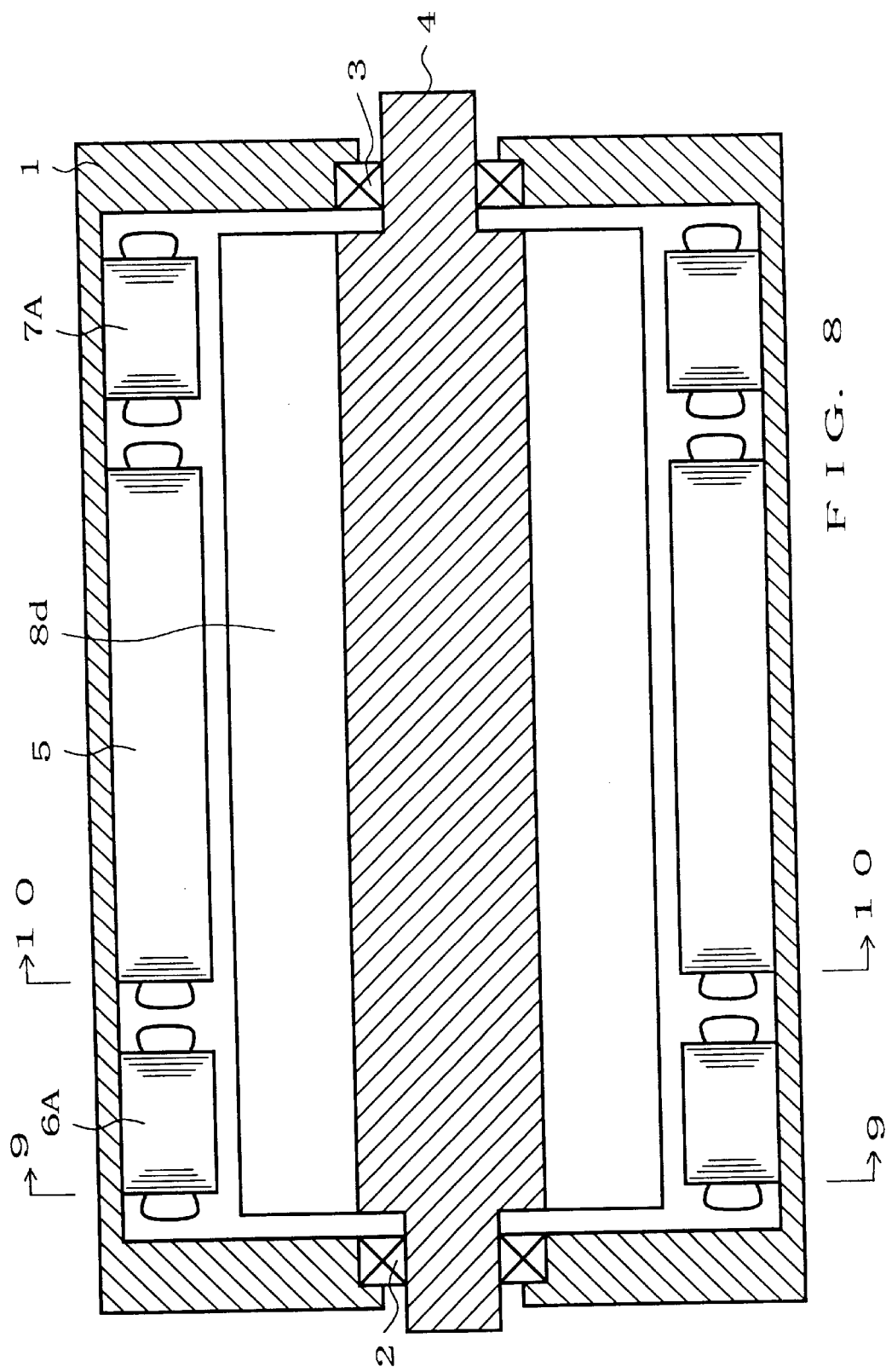
FIG. 8 is a sectional view of a rotary synchronous motor according to another embodiment of the present invention, taken longitudinally through a rotational shaft thereof.
Figure 9:
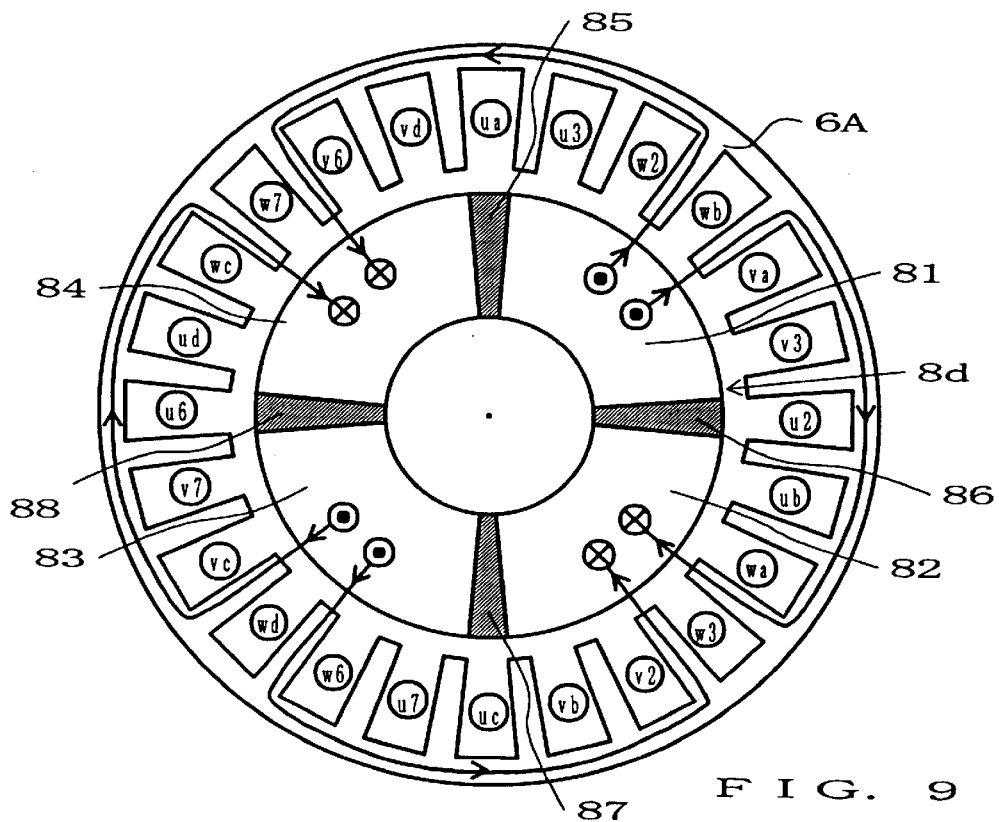
FIG. 9 is a sectional view of the rotary synchronous motor taken along the line 9—9 of FIG. 8.

FIG. 8 illustrates a rotary synchronous motor according to another embodiment of the present invention. Those elements denoted with the same reference characters as in FIG. 1 are the same in structure as the counterparts of FIG. 1 and will not be described here to avoid unnecessary duplication. FIG. 9 is a sectional view of the rotary synchronous motor taken along the line 9—9 of FIG. 8. The structure of the motor as viewed along the line 10—10 of FIG. 8 is similar to that of FIG. 2. The rotary synchronous motor of FIG. 8 is different from that of FIG. 1 in that magnetic field cores 6A and 7A are cylindrical laminated iron cores which are provided along the inner peripheral surface of the stator frame similarly to the armature core 5 and located adjacent to the opposite ends of the armature core 5, and also in that rotor 8d is axially extended so as to be magnetically coupled with the magnetic field cores 6A and 7A.

Like the armature core 5, the cylindrical magnetic field core 6A has 24 slots formed along the inner periphery thereof, in which are received two sets of three-phase field windings. Each of the laminated iron cores of the cores 6A and 7A comprises a plurality of thin silicon steel rings stacked in the axial direction.

The three-phase windings on the magnetic field core 6A comprise two (first and second) u-phase, v-phase and w-phase windings which are wound to be shifted from each other by 120 electrical degrees.

The u-phase windings are positioned on the magnetic field core 6A via eight slots in order of "ua"-"u2"-"u3"-"ub"-"uc"-"u6"-"u7"-"ud". The v-phase windings are positioned on the magnetic field core 6A via eight slots in order of "va"-"v2"-"v3"-"vb"-"vc"-"v6"-"v7"-"vd". Further, the w-phase windings are positioned on the magnetic field core 6A via eight slots in order of "wa"-"w2"-"w3"-"wb"-"wc"-"w6"-"w7"-"wd".

The u-phase, v-phase and w-phase windings on the core 6A are shifted from each other by 120 electrical degrees; more specifically, these u-phase, v-phase and w-phase windings are shifted from each other by four slots in the clockwise direction.

As in the above-mentioned core 6A, two sets of three-phase field windings are positioned on the cylindrical magnetic field core 7A. The three-phase field windings on the magnetic field core 6A and 7A are phase shifted, by 90 electrical degrees, from the corresponding windings on the armature core 5. Namely, for example, the first u-phase field winding is positioned to be be shifted from the first U-phase armature winding by three slots (90 electrical degrees) in the clockwise direction. Similarly, the v-phase and w-phase field windings are positioned to be be shifted from the V-phase and W-phase windings, respectively, by three slots (90 electrical degrees) in the clockwise direction.

The rotor 8d of FIG. 8 is constructed generally in the same manner as the rotor 8 of FIG. 1. The rotor 8d is generally in a cylindrical shape and provided along the outer peripheral surface of the rotational shaft 4. The rotor 8d includes an alternating sequence of four magnetic sections 81 to 84 and four nonmagnetic sections 85 to 88 positioned around the rotational shaft 4. The nonmagnetic sections 85 to 88 separate magnetic sections 81 to 84 from each other in such a manner that the magnetic sections 81 to 84 are not magnetically coupled with each other in the rotational direction of the rotor 8d. However, the magnetic sections 81 to 84 are magnetically coupled with the armature core 5 and magnetic field cores 6A and 7A. By the magnetic sections 81 to 84 being thus magnetically separated by the nonmagnetic sections 85 to 88, the magnetic flux output from the N poles of the magnetic field cores 6A and 7A are easily directed into the armature core 5 by way of the magnetic sections 81 to 84.

Three-phase alternating currents iu, iv and iw, phase-shifted from each other by 120 electrical degrees, are passed through the three-phase windings on the field core 6A.

By such currents iu, iv and iw flowing through the three-phase filed windings on the field core 6A, N poles producing magnetic flux directed toward the curved surface of the magnetic sections 82 and 84 of the rotor 8*d* and S poles absorbing magnetic flux directed from the magnetic sections 81 and 83, as shown in FIG. 9, are produced on the inner peripheral surface of the core 6A and caused to revolve in the clockwise direction on the inner peripheral surface of the core 6A. Similar three-phase alternating currents iu, iv and iw are passed through the three-phase windings on the field core 7A, so that N and S poles are both caused to revolve in the clockwise direction on the inner peripheral surface of the core 7A as with the core 6A.

If the currents flowing through the three-phase field windings are controlled in such a manner that the pole center of the magnetic fields produced by the field windings is positioned on an "easiest-to-magnetize" surface portion of the rotor 8*d*, i.e., near the centers of the magnetic sections 81 to 84, the rotor 8*d* will be magnetized in predetermined directions.

Namely, the magnetic sections 81 to 84 will be magnetized in predetermined directions depending on the N and S poles produced on the cores 6A and 7A. For example, by the currents iu, iv and iw, N poles are produced on the inner peripheral surfaces of the field cores 6A and 7A facing the curved outer surfaces of the magnetic sections 82 and 84 and S poles are produced on the inner peripheral surfaces of the field cores 6A and 7A facing the curved outer surfaces of the magnetic sections 81 and 83. In response to this, the curved outer surfaces of the magnetic sections 82 and 84 facing the field cores 6A and 7A become S poles and the curved outer surfaces of the magnetic sections 82 and 84 facing the armature core 5 become N poles, and similarly, the curved outer surfaces of the magnetic sections 81 and 83 facing the field cores 6A and 7A become N poles and the curved outer surfaces of the magnetic sections 81 and 83 facing the armature core 5 become S poles.

Namely, as shown in FIG. 9, the magnetic flux from the N poles of the field cores 6A and 7A enters the magnetic sections 82 and 84 through their S-pole curved outer surfaces. The magnetic flux, after having entered the magnetic sections 82 and 84, flows axially toward the armature core 5 to enter the core 5 via the N-pole curved outer surfaces of the sections 82 and 84 as shown in FIG. 2, and then flows through the outer peripheral portion of the core 5 to enter the magnetic sections 81 and 83 via their S-pole curved outer surfaces. After this, the magnetic flux flows axially in the magnetic sections 81 and 83 to enter the S-pole inner surfaces of the magnetic cores 6A and 7A from the N-pole curved outer surface of the sections 81 and 83. Thus, in this synchronous machine, predetermined closed magnetic circuits are formed by the magnetic field cores 6A and 7A, rotor 8*d* and armature core 5.

In the meantime, three-phase alternating currents IU, IV and IW, phase-shifted from each other by 120 electrical degrees, are passed through the three-phase windings on the armature core 5. By the three-phase alternating currents IU, IV and IW, torque T is developed in accordance with the Fleming's rule, which causes rotation of the rotor 8*d* (rotational shaft 4).

According to the above-described arrangement of the synchronous motor of FIG. 9, the magnetic field cores 6A and 7A and armature core 5 can be of similar construction, so that steps for manufacturing the motor can be substantially simplified.

Figure 10:
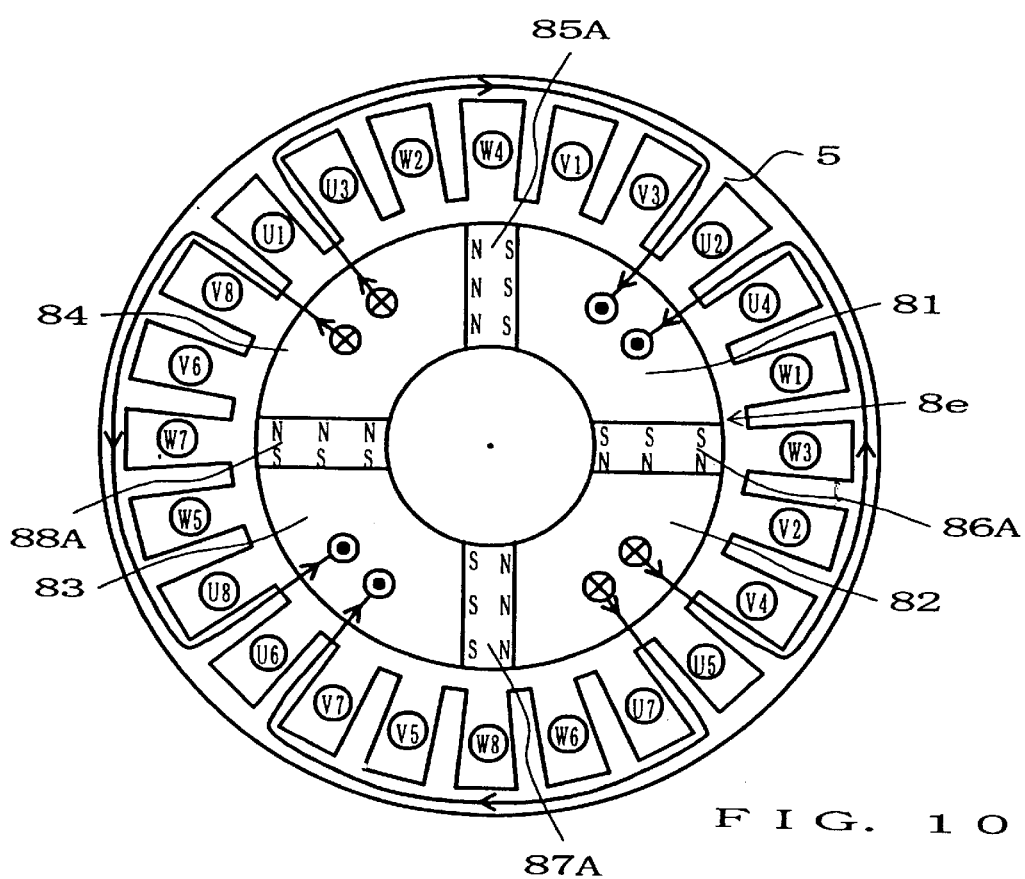
FIG. 10 is a diagram illustrating still another embodiment of the four-pole rotor of FIG. 2.

FIG. 10 is a diagram illustrating still another embodiment of the four-pole rotor 8 shown in FIGS. 1 and 2.

The rotor 8*e* of FIG. 10 is different from the rotor 8 in that the magnetic sections 81 to 84 provided along the direction of passage of the magnetic flux produced by the field windings (i.e., along the rotational shaft) are magnetically separated from each other by permanent magnets 85A to 88A. S poles of the permanent magnets 85A to 88A face the magnetic sections 81 and 83 while N poles of the permanent magnets 85A to 88A face the magnetic sections 82 and 84, so as to magnetically separate the magnetic sections 81 to 84 from each other.

By thus magnetically separating the magnetic sections 81 to 84 from each other by use of the permanent magnets 85A to 88A, the rotor 8*e* can be caused to rotate without any exciting currents flowing through the field windings. However, because the rotating torque T depends on the intensities of the magnetic poles of the permanent magnets 85A to 88A and armature currents, it can not be controlled in an optimum manner over a wide range. Thus, in the rotary synchronous motor of the present invention, the so-called hybrid rotor 8*e* is provided which controls the intensities of the magnetic poles by appropriately controlling the intensities of the currents flowing through the field windings to thereby adding or subtracting the magnetic flux by the field windings to or from the magnetic flux by the permanent magnets 85A to 88A, so as to allow the torque to be controlled over a wide range.

Note that the nonmagnetic sections 85 to 88 in the rotors 8*a* and 8*b* of FIGS. 6 and 7 may also be replaced by permanent magnets. Further, in each of the rotors 8*a*, 8*b* and 8*e* of FIGS. 6, 7 and 10, permanent magnets may be positioned between the rotor and rotational shaft 4 in such a manner that their S poles face the magnetic sections 81 and 83 while their N poles face the magnetic sections 82 and 84. In case permanent magnets are provided in the rotor 8*d* of FIG. 8 (FIG. 9), such magnets must be provided only in portions of the rotor 8*d* which are magnetically coupled with the armature core 5 (i.e., which are surrounded by the armature core 5) with no permanent magnet provided in portions of the rotor 8*d* which are magnetically coupled with the magnetic field cores 6A and 7A.

Figure 11:
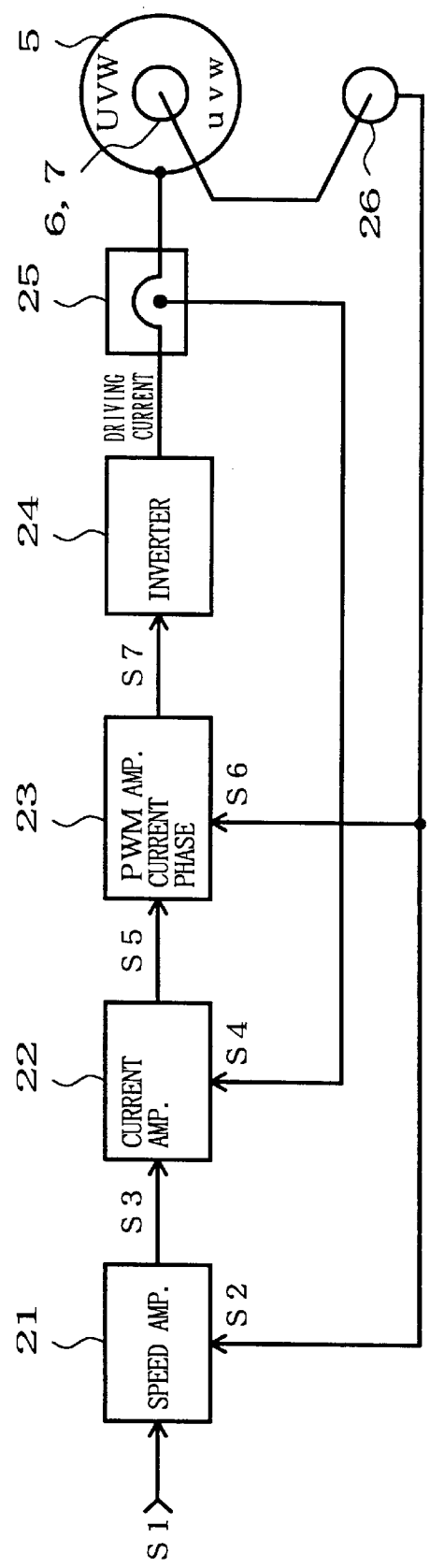
FIG. 11 is a block diagram illustrating an A.C. servo motor system employing the synchronous motor according to the present invention.

FIG. 11 is a block diagram illustrating an A.C. servo motor system employing the synchronous motor according to the present invention, where the armature windings and field windings of the synchronous motor are mechanically positioned to be phase-shifted by 90 electrical degrees and connected in the manner shown in FIG. 5.

To the rotational shaft of the synchronous motor is connected a detector 26, such as a rotary encoder or rotary resolver, for detecting a rotating speed and magnetic pole positions of the motor. The detector 26 feeds signal S2 indicative of a rotating speed of the motor back to a speed amplifier 21 and also feeds signal S6 indicative of rotating positions of the magnetic fields or magnetic pole positions of the motor back to a PWM amplifier 23.

The speed amplifier 21 receives rotating speed instruction S1 and the motor rotating speed signal S2 from the detector 26 to calculate an offset between the speeds indicated by the signals S1 and S2 and supplies a current amplifier 22 with current instructing signal (torque signal) S3 depending on the calculated speed offset. The current amplifier 22 amplifies a difference between electric current feedback signal S4 detected by a current detecting isolator 25 (i.e., feedback signal of detected U-phase and V-phase currents) and the current instructing signal S3 from the current amplifier 22 and then supplies the PWM amplifier 23 with the amplified current difference as input signal S5. The PWM amplifier 23, in turn, obtains three-phase PWN signal, i.e., inverter control signal S7 on the basis of the input signal S5 from the current amplifier 22 and magnetic pole position signal S6 from the detector 26 and then outputs the inverter control signal S7 to an inverter 24. The inverter 24 is driven, in response to the inverter control signal S7, to supply driving currents to the armature and field windings of the individual phases.

Figure 12:
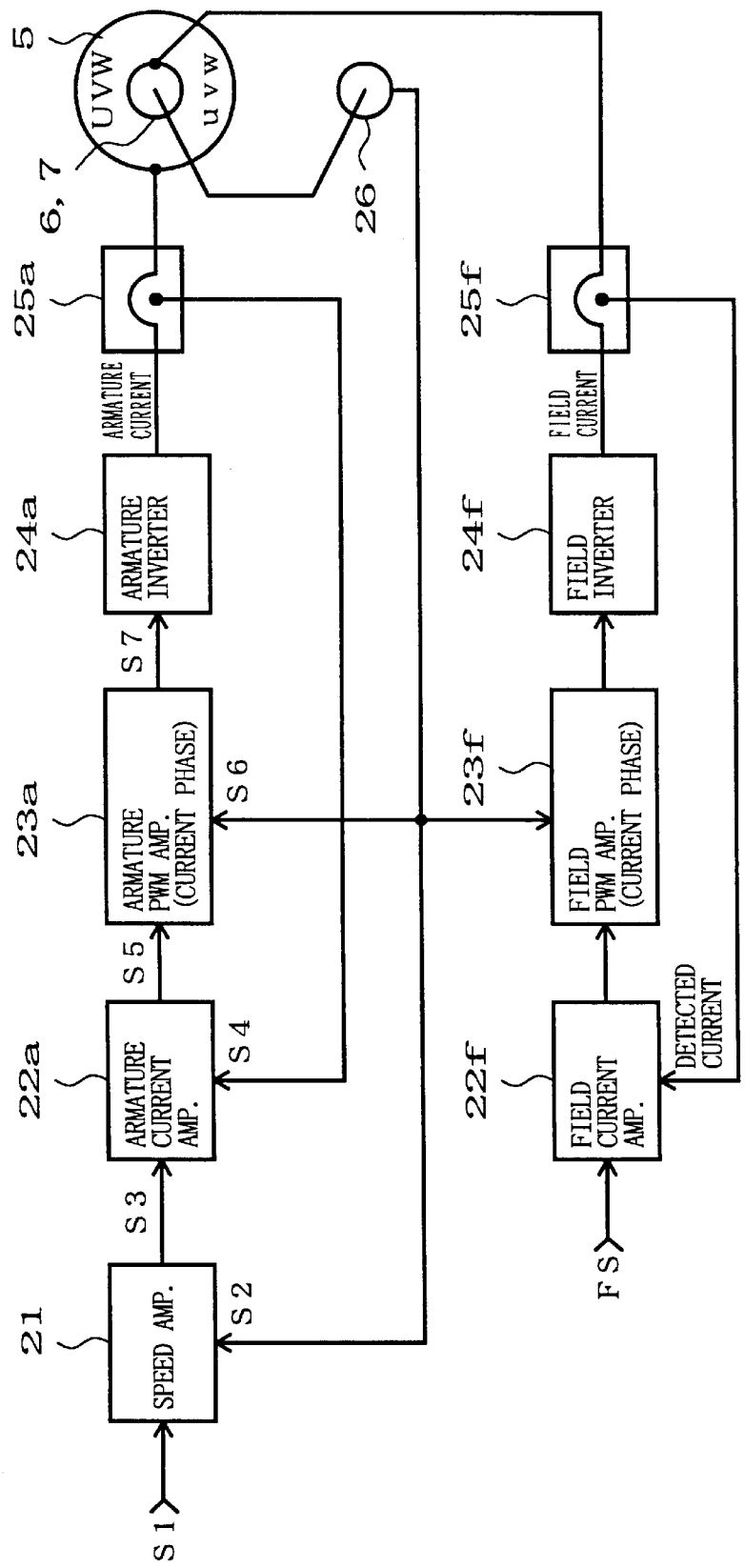
FIG. 12 is a block diagram illustrating another example of the A.C. servo motor system employing the synchronous motor according to the present invention.

FIG. 12 is a block diagram illustrating another example of the A.C. servo motor system employing the synchronous motor according to the present invention. The A.C. servo motor system will be described here in relation to a case where the armature windings and field windings are mechanically positioned separately to be in phase with each other, rather than being phase-shifted by 90 electrical degrees and where armature currents and magnetic field currents, phase-shifted by 90 electrical degrees, are supplied to the armature windings and field windings. While in the A.C. servo motor system of FIG. 11 the armature currents and magnetic field currents are the same, in the system of FIG. 12 the magnetic field currents can be controlled as desired independently.

In the A.C. servo motor system of FIG. 12, the control for the armature currents is generally the same in structure as that in the system of FIG. 11 and includes a speed amplifier 21a, an armature current amplifier 22a, an armature PWM amplifier 23a, an armature inverter 24a and an armature current detecting isolator 25a, and desired armature currents are supplied to the U-phase, V-phase and W-phase armature windings. The control for the magnetic field currents includes a magnetic field current amplifier 22f, a magnetic field PWM amplifier 23f, a magnetic field inverter 24f and a magnetic field current current detecting isolator 25f. Because no speed amplifier is provided in this magnetic field currents control, magnetic field current instructing signal FS is input directly to the magnetic field current amplifier 22f.

Figure 13:
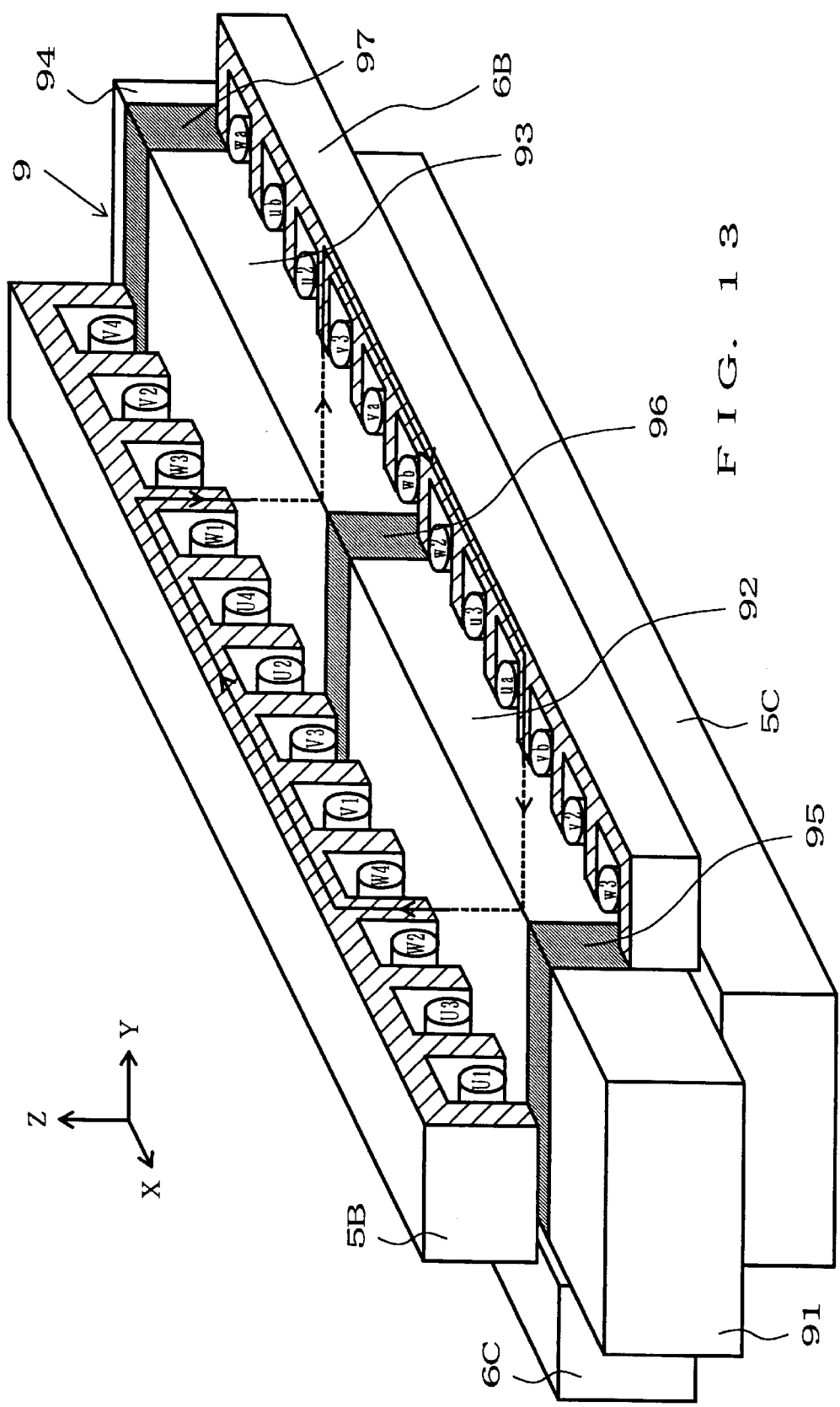
FIG. 13 is a perspective view, partly in section, of a linear synchronous motor implemented as another embodiment of the synchronous motor according to the present invention.

With the A.C. servo motor system of FIG. 11 or 12 arranged in the above-mentioned manner, the synchronous motor according to the present invention is allowed to operate as an A.C. servo motor rotating at a desired speed. Whichever rotating position the rotational shaft may be in, the A.C. servo motor systems of FIGS. 11 and 12 detect the shaft's rotating position so as to control the phases of the magnetic field currents in such a manner that the pole center of the rotational shaft coincide with the pole center of the rotating magnetic fields. This allows the rotational shaft to be always revolved with maximum torque FIG. 13 is a perspective view, partly in section, of a linear synchronous motor implemented as another embodiment of the synchronous machine according to the present invention. The linear synchronous motor is a motor driven by three-phase alternating currents which is similar in structure to the rotary synchronous motor of FIG. 8. The linear synchronous motor of FIG. 13 comprises: an elongate linear moving member 9 which is made by linearly unfolding the rotor 8 shown in FIG. 2; and linear armature cores 5B and 5C and linear magnetic field core 6B and 6C which are made by linearly unfolding the armature core 5 (shown in FIG. 2) and magnetic core 6A (shown in FIG. 9), employed in the motor of FIG. 8, over the lengths corresponding to two poles (12 slots) and positioning such unfolded cores along the left and right and upper and lower surfaces of the linear moving member 9. The linear armature cores 5B and 5C and linear magnetic field core 6B and 6C are fixed to a same stator frame (not shown in FIG. 13). It should be appreciated that where the linear moving member 9 is unmovably fixed, the linear armature cores 5B and 5C and linear magnetic field core 6B and 6C are mounted for linear movement, but where the linear armature cores 5B and 5C and linear magnetic field core 6B and 6C are unmovably fixed, the moving member 9 is mounted for linear movement.

The linear armature cores 5B and 5C are identical in structure, and only the structure of one of the cores 5B is described here. The linear armature core 5B is generally in the shape of a comb and has 12 slots along a direction of movement (X direction). Three-phase (U-phase, V-phase and W-phase) windings are received in the 12 slots similarly to the arrangement of FIG. 2. Specifically, the U-phase winding is positioned on the linear armature core 5B via four slots in order of ascending winding portion numbers "U1"-"U2"-"U3"-"U4" as shown in FIG. 13. The V-phase winding is positioned on the linear armature core 5B via four slots in order of ascending winding portion numbers "V1"-"V2"-"V3"-"V4". The W-phase winding is also positioned on the linear armature core 5B via four slots in order of ascending winding portion numbers "W1"-"W2"-"W3"-"W4".

The linear magnetic field cores 6B and 6C are identical in structure, and only the structure of one of the cores 6B is described here. The linear magnetic field core 6B is generally in the shape of a comb like the armature core 5B and has 12 slots along the direction of movement (X direction). Three-phase (u-phase, v-phase and w-phase) windings are received in the 12 slots as in the arrangement of FIG. 9 and phase-shifted, by 90 electrical degrees, from the armature windings. Namely, in FIG. 13, the three-phase field windings are phase-shifted, by three slots, from the corresponding armature windings. Specifically, the u-phase winding is positioned on the linear magnetic field core 6B via four slots in order of "ua"-"u2"-"u3"-"ub" as shown in FIG. 13. The v-phase winding is positioned on the linear magnetic field core 6B via four slots in order of "va"-"v2"-"v3"-"vb". The w-phase winding is also positioned on the linear magnetic field core 6B via four slots in order of "wa"-"w2"-"w3"-"wb".

The linear moving member 9 is made by linearly unfolding the rotor 8 of FIG. 2 as noted earlier and includes an alternating sequence of a plurality of magnetic sections 91 to 94 and nonmagnetic sections 95 to 97 arranged along the direction of movement (X direction). The nonmagnetic sections 95 to 97 separates the magnetic sections 91 to 94 from each other in such a manner that the magnetic sections 91 to 94 are not magnetically coupled with each other in the direction of movement. By the magnetic sections 91 to 94 being thus magnetically separated from each other via the nonmagnetic sections 95 to 97, magnetic flux flowing from the N poles of the linear magnetic field cores 6B and 6C is allowed to be coupled with the linear armature cores 5A and 5C by way of the magnetic sections 92 and 93.

Magnetic field currents iu, iv and iw are supplied to the three-phase windings on the linear magnetic field core 6B, in response to which N poles producing magnetic flux directed toward the magnetic sections 92 of the linear moving member 9 and S poles absorbing magnetic flux directed from the magnetic section 93 are produced on the inner surface of the magnetic field core 6B, and these N and S poles are caused to move in the direction of movement (X direction). Similar field currents iu, iv and iw are also supplied to the three-phase windings on the linear magnetic field core 6C, so that N and S poles are caused to move in the same direction of movement as in the field core 6B.

If the currents passed through the three-phase field windings are controlled in such a manner that the pole center of the magnetic fields produced by the field windings is positioned on an "easiest-to-magnetize" surface portion of the linear moving member 9, i.e, near the center of the magnetic sections 92 and 93, the moving member 9 will be magnetized in a predetermined direction. Namely, the magnetic sections 92 and 93 of the moving member 9 will be magnetized in a predetermined direction depending on N and S poles produced on the linear magnetic field cores 6B and 6C. For example, by the currents iu, iv and iw, N poles are produced on the surfaces of the field cores 6B and 6C facing the surfaces of the magnetic section 92 and S poles are produced on the surfaces of the field cores 6B and 6C facing the surfaces of the magnetic section 93. In response to this, the surfaces of the magnetic section 92 facing the field cores 6B and 6C become S poles and the surfaces of the magnetic section 93 facing the linear armature cores 5B and 5C assume N poles.

As shown in FIG. 13, the magnetic flux flowing from the N pole of the field core 6B enters the magnetic section 92 through its S-pole surface. The magnetic flux, after having entered the magnetic section 92, enters the linear armature core 5B via the N-pole surface of the section 92, and then flows in the core 5B in the direction of movement to enter the magnetic section 93 via its S-pole surface. After this, the magnetic flux flows into the S-pole inner surface of the magnetic core 6B via the N-pole surface of the section 93. Thus, in this linear synchronous motor, a predetermined closed magnetic circuit is formed by the, magnetic field core 6B, linear moving member 9 and armature core 5B.

In the meantime, three-phase alternating currents IU, IV and IW, phase-shifted from each other by 120 electrical degrees, are passed through the three-phase windings on the linear armature cores 5B and 5C. By the three-phase alternating currents (armature currents) IU, IV and IW, a driving thrust is developed in accordance with the Fleming's rule, which causes the linear moving member 9 to move in a predetermined direction.

While the linear synchronous motor of FIG. 13 has been described above in relation to a case where the linear moving member 9 is made by linearly unfolding the rotor 8 of FIG. 2, the moving member 9 may be made by linearly unfolding the rotor 8a, 8b or 8e of FIG. 6, 7 or 10, or the moving member 9 may be an optional combination of these linearly unfolded rotors.

Further, while the linear synchronous motor of FIG. 13 has been described above in relation to a case where two armature cores and two magnetic field cores are mounted along the linear moving member 9, any other number of the armature and magnetic field cores may be employed as long as at least one pair of the armature core and magnetic field core is included. For example, two magnetic field cores and one armature core, one magnetic field core and two armature cores, or three magnetic field cores and three armature cores may be employed.

Furthermore, while the linear synchronous motor of FIG. 13 has been described above in relation to a case where the linear moving member 9 is shaped into a rectangular parallelepiped, the member 9 may be in any other shape, such as a column, cylinder, cylindroid or elliptic cylinder. In such a case, the opposed surfaces of the magnetic field and armature cores must be shaped to appropriately correspond to the outer peripheral surface of the linear moving member. For instance, if the linear moving member 9 is in the shape of a column, the opposed surfaces of the magnetic field and armature cores must be shaped to appropriately correspond to the convexly curved outer peripheral surface of the column.

The linear synchronous motor of FIG. 13 may be controlled by the A.C. servo motor system of FIG. 11 or 12.

The magnetic sections in the above-mentioned embodiments may be made of any of iron material (e.g., pure iron, soft iron, cast steel, magnetic steel band, or nondirectional or directional silicon steel), iron-nickel alloy (e.g., Permalloy, Isoperm or Perminvar), dust core (carbonyl dust core, Permalloy dust core or Sendust dust core), or ferrite (spinel ferrite, composite ferrite such as Mn—Zn ferrite, Cu—Zn ferrite, Ni—Zn ferrite or Cu—Zn—Mg ferrite).

The embodiments of FIGS. 1 and 8 have been described above in relation to a case where the magnetic field cores are provided adjacent to the opposite end portions of the rotor, only one such magnetic field core may be provided adjacent to one end portion of the rotor. Alternatively, the magnetic field cores of FIGS. 1 and 8 may be provided in combination in relation to a single rotor.

In another alternative, the rotor may be supported only via the bearings 2 and may have a greater diameter than that of the magnetic field core with the s of FIGS. 1 and 8. In this case, necessary wiring for the magnetic field and armature cores may be provided from the other surface of the rotor. Similarly, in the embodiment of FIG. 13, the linear moving member 9 may have a greater size than those of the magnetic field and armature cores and these cores may be mounted within the moving member 9. In this case, necessary wiring for the magnetic field and armature cores may be provided by forming linear wiring slits in the moving member 9.

Although the present invention has been described so far as implemented as synchronous motors, the invention may also be applied as a synchronous power generator, where electromotive force is induced in the armatures winding by supplying the field windings with currents corresponding a rotating position of the rotor and extracted from the armature windings. In such a case, a position, similar to the detector 26 as shown in FIGS. 11 and 12 detector for detecting a rotating position of the rotor may be provided on the same rotational shaft as the rotor so that the currents for the magnetic field windings are controlled depending on the detected rotating position.

Further, although the description has been made above on four-pole/24-slot or double-pole/12-slot synchronous machines, the numbers of poles and slots should not be understood as limited to the above-mentioned, rather the combination of the numbers may be selectively varied as required. Furthermore, while the armature windings have been described as single-layer lap windings, they may be double-layer lap windings.

According to the present invention having been described thus far, it is possible to provide both the field windings and the armature windings on the stator and thereby eliminate the need to provide slip rings and rotary transformer on the rotor. This feature achieves a simplified and strengthened rotor structure and allows the intensity of magnetic flux to be freely controlled via the armature windings on the stator.

What is claimed is:

1. A synchronous machine comprising:
   a stator frame;
   a magnetic field core secured on said stator frame and having field windings positioned thereon, said field windings being excited by multi-phase alternating currents to produce a first linearly moving magnetic field;
   an armature core secured on said stator frame in a spaced-apart relation to said magnetic field core and having armature windings positioned thereon, said armature windings being excited by multi-phase alternating currents to produce a second linearly moving magnetic field which synchronizes with said first linearly moving magnetic field in a predetermined phase relationship thereto; and a member movable relative to said stator frame and having a plurality of magnetic substance sections which are magnetically separated from each other in a direction of motion and are also spaced from said magnetic field core and armature core via air gaps, magnetic flux paths being formed through said magnetic field core, magnetic substance sections and armature core to produce magnetic poles on surfaces of said magnetic substance sections facing said air gaps, whereby said member moves relative to said stator frame with movement of said first and second linearly moving magnetic fields.

2. A synchronous machine as claimed in claim 1 wherein each of said magnetic substance sections includes a plurality of magnetic substance segments separated by a nonmagnetic material in the direction of movement.

3. A synchronous machine as claimed in claim 1, wherein each of said magnetic substance sections includes a plurality of magnetic substance segments separated from each other by a nonmagnetic material in the direction of movement, and thicknesses, in the direction of movement, of said magnetic substance segments are chosen such that the thicknesses gradually change in a predetermined pattern corresponding to a magnetic flux distribution in the magnetic pole on the surface of the substance section.

4. A synchronous machine as claimed in claim 1 wherein thicknesses, in the direction of movement, of said magnetic substance segments of said member correspond to a magnetic flux distribution of the moving magnetic poles.

5. A synchronous machine as claimed in claim 1 wherein the field windings include at least three windings that are provided on said magnetic field core to be phase-shifted from each other by 120 electrical degrees, and the field windings are excited by three-phase alternating currents phase-shifted by 120 electrical degrees, and wherein the armature windings include at least three windings that are provided on said armature core to be phase-shifted from each other by 120 electrical degrees and from the field windings by 90 electrical degrees, and three-phase alternating currents in phase with the currents exciting the field windings are supplied to the armature windings.

6. A synchronous machine as claimed in claim 1 wherein said magnetic substance sections are separated from each other by a nonmagnetic material.

7. A synchronous machine as claimed in claim 6 wherein said nonmagnetic material is made of an electrically conductive material such as copper or aluminum.

8. A synchronous machine as claimed in claim 1 wherein said magnetic substance sections are separated from each other by a permanent magnet.

* * * * *